Nov. 29, 1927.
E. H. WORTHINGTON
1,650,922
WINDSHIELD
Filed Dec. 24, 1923
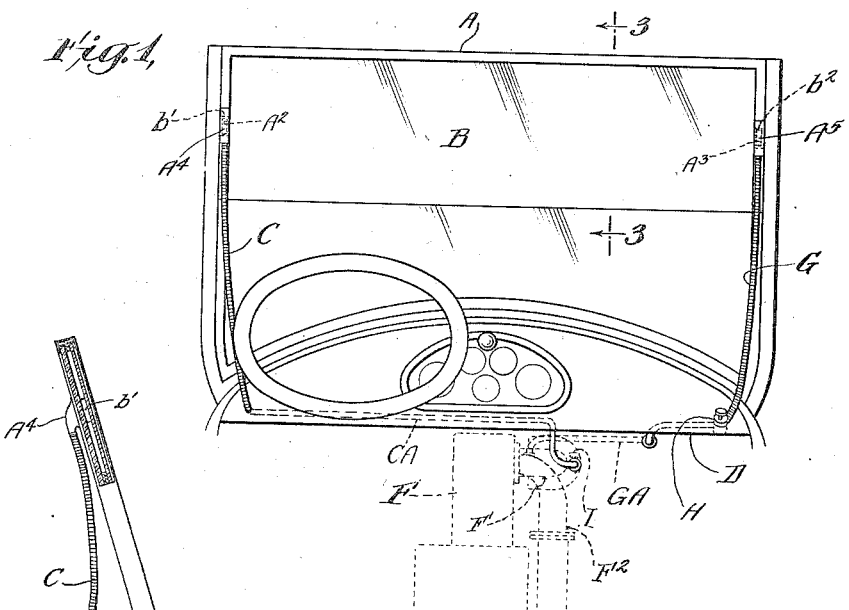
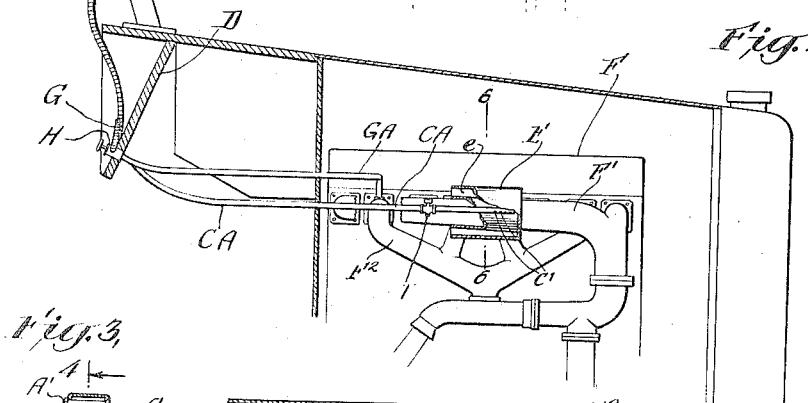
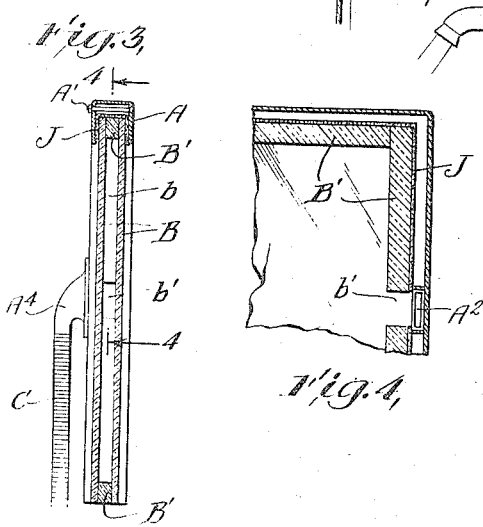
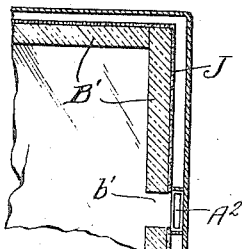
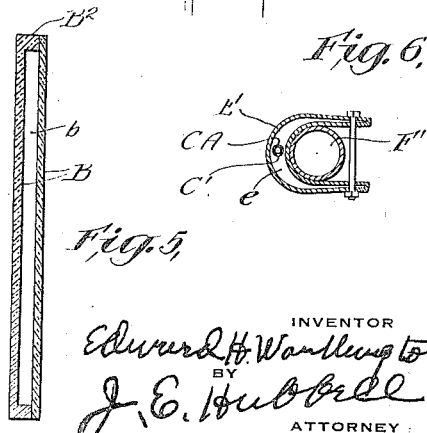
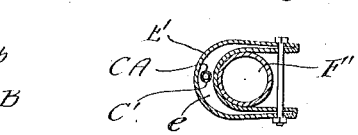
INVENTOR
Edward H. Worthington
BY J. E. Hubbell
ATTORNEY Patented Nov. 29, 1927.

1,650,922

UNITED STATES PATENT OFFICE.

EDWARD H. WORTHINGTON, OF SHAWNEE-ON-DELAWARE, PENNSYLVANIA.

WINDSHIELD.

Application filed December 24, 1923. Serial No. 682,422.

The primary object of my invention is to provide simple and effective means for supplying heat to an automobile windshield or analogous window structure, to prevent the deposit of snow or ice thereon, and to eliminate or minimize the impairment of transparency which results from moisture accumulations on the window. In accordance with the present invention I form the windshield or other window proper, with double transparent walls, which are ordinarily formed of glass, and are separated by a space through which I circulate a heating medium, which ordinarily and preferably is hot air. In automobile use, for which the invention is primarily devised and adapted, I preferably heat the air employed in heating the windshield by passing the air through a heater absorbing heat from the engine exhaust, and obtain the desired circulation of the air through the windshield space by connecting the latter to some suction creating part of the automobile power plant, such as the suction intake of the engine.

I am aware that it was heretofore proposed to form windshields and other windows with spaced apart transparent walls, and to supply heat to the space between the walls in order to eliminate or minimize troubles due to frost, snow or moisture accumulations, but, so far as I am aware, none of the proposals heretofore made have been satisfactory from a practical standpoint, and none of them to my knowledge, have gone into general use on automobiles. As distinguished from these prior proposals, my invention is characterized by the fact that I obtain a positive circulation of the heated air in a simple and effective manner and with a sufficiently close spacing of the two transparent walls of the window to avoid the material interference with vision through the window which results inevitably when the transparent walls are spaced somewhat farther apart.

The various features of novelty which characterize my invention are pointed out with particularity in the claims annexed to and forming a part of this specification. For a better understanding of the invention, however, its advantages and specific objects obtained with its use, reference should be made to the accompanying drawings and descriptive matter, in which I have illustrated and described preferred embodiments of my invention.

Of the drawings:

Fig. 1 is an elevation of an automobile windshield viewed from the interior of the car and with the engine shown in dotted outline;

Fig. 2 is a diagrammatic side elevation of the engine and windshield with parts broken away and removed;

Fig. 3 is a section on the line 3—3 of Fig. 1;

Fig. 4 is a partial section on the line 4—4 of Fig. 3;

Fig. 5 is a section of the glass portion of the windshield taken similarly to Fig. 3 but indicating a modified construction; and Fig. 6 is a section on the line 6—6 of Fig. 2.

In the particular embodiment of my invention illustrated in the Figs. 1-4 of the drawings, A represents the frame of the upper hinged section of a windshield of conventional form except for the provision of the double glass window walls B and the provisions for obtaining the desired circulation of hot air through the space $b$ between the glass walls B. Hot air is supplied to the space $b$, preferably at the end of the windshield at the driver's side of the automobile, through a conduit shown as comprising sections C and CA at the rear and in front, respectively of the automobile dash, from a hot air heater E associated with and deriving heat from the exhaust manifold F' of the automobile engine F. The air thus passed into the windshield space is withdrawn from the latter through a conduit shown as comprising sections G and GA at the rear and in front respectively, of the automobile dash D, by the vacuum creating effect of the intake $F^2$ of the engine F, to which one end of the conduit section GA is connected. Preferably provisions are made for regulating the circulation through the windshield or dispensing with this circulation when not wanted. The provisions shown for this purpose comprise a regulating valve H mounted in the dash D and connecting the conduit sections G and GA, and a cock I in the conduits section CA.

Those skilled in the art will understand that many variations may be made in the manner in which the glass walls B are mounted in the frame A, and in the character of the latter and of the air heater E and of the provisions for introducing the heated air into and withdrawing it from the space $b$ between the glass walls B. As shown, the frame A is of a well known type which runs along the top and ends only of the windshield glass and comprises glass clamping parts which may be drawn together by the screws A'. Felt or analogous cushion material J is interposed between the glass and frame A. The glass plates B are spaced apart by marginal spacer strips B' of any suitable material. In the type of windshield shown, the spacer strip B' at the bottom of the windshield is preferably made of glass or other transparent material and all of the spacer strips B' may well be made of glass and be cemented to the plates B by a suitable waterproof and transparent cement. Inlet and outlet ports $b'$ and $b^2$ to the space $b$ are provided by omitting corresponding portions of the spacers B'. As shown, the ports $b'$ and $b^2$ open to chamber spaces $A^2$ and $A^3$ formed in the windshield frame A, which is provided on its rear side with hollow lugs $A^4$ and $A^5$ respectively, to which the conduit sections C and G are connected. The latter are flexible to accommodate the adjustments of the hinged windshield, and may well be made of armored hose, as may the conduit sections CA and GA, though the latter are preferably made of metal tubing, as shown.

The simple and effective air heater E shown is especially adapted for attachment to existing types of automobile engines and is in the form of a hollow walled structure of U shape which forms a sort of a jacket about a portion of the engine exhaust manifold F', on which it is bolted. The inner and outer walls of the heater E are advantageously formed of copper or brass, and the space $e$ between the walls is closed at the front end but is open at its rear and to the space beneath the hood of the automobile. The conduit section CA extends into the space $e$. As shown, the front end of the pipe CA is closed and air is sucked into the pipe through a series of apertures C' distributed along the length of the porward portion of the pipe CA. Advantageously the apertures C' are formed at the under side of the pipe CA.

With the described arrangement for supplying heated air to the hollow windshield, there will ordinarily be little opportunity for dust to deposit on the inner sides of the glass plates B. Trouble from this cause and the resultant necessity for occasionally cleaning the inner walls of the space $b$ can be eliminated wholly or largely by providing an air filter as by placing fibre asbestos or mineral wool in the inlet end portion of the heater E, but ordinarily I do not consider an air filter necessary.

In Fig. 5 I have illustrated a modification of the windshield structure in which the separate spacers B' are replaced by an integral marginal rib $B^2$ on one of the glass plates B. The joint between the rib $B^2$ and other plate B may be cemented together, or the parts may be welded together.

In operation the hot air circulation through the windshield space $b$ may be maintained when needed and dispensed with when unnecessary, and the amount of air passing through the windshield may be readily adjusted by manipulating the valve H as required to give the desired windshield heating effect. While substantially higher, as well as lower temperatures may be maintained, in practice I contemplate the maintenance of a windshield glass temperature of 80° to 100° F. in ordinary cold or wet weather. The maintenance of such a temperature will prevent frost, snow, ice or fog-like moisture films on the windshield. The maintenance of such a temperature will not prevent some impairment of vision through the windshield from rain drops accumulating on the outer surface of the windshield in rainy weather, but the drying effect of the heated windshield glass will reduce the trouble from this cause and shorten the periods in which such trouble is experienced. When the windshield is provided with a cleaning device, such as are now in use for removing rain drops, the invention will prevent the operation of the cleaning device from being interfered with by snow or ice deposits and will quickly eliminate the moisture film ordinarily left on the glass by the cleaning device when the latter is used to remove rain drops. The use of the invention also eliminates the impairment of windshield transparency frequently experienced in closed cars as a result of the deposit of moisture from the breaths of the car occupants on the inner surface of the windshield.

In practice the distance between the adjacent sides of the two windshield glass walls B is preferably made quite small, say one-eighth of an inch or less. This minimizes the impairment of vision through the windshield due to glass refraction, and makes it possible to keep the windshield as a whole comparatively thin. It also tends to spread out the hot air flowing between the inlet and outlet ports $B^1$ and $B^2$ into a stream filling the space $b$ from top to bottom. The fact that the inlet B' is at the end of the windshield at the driver's side of the car insures a maximum heating effect on the portion of the windshield in front of the driver, where it is most useful.

While in accordance with the provisions of the statutes I have illustrated and described the best forms of my invention now known to me, it will be apparent to those skilled in the art that many changes may be made in the form of the apparatus disclosed without departing from the spirit of my invention, as set forth in the appended claims, and that certain features of the invention may sometimes be used with advantage without a corresponding use of other features.

Having now described my invention, what I claim as new and desire to secure by Letters Patent, is:

1. The combination of a window comprising double transparent walls separated by a space having inlet and outlet ports opening to said space, of means for supplying a heated gaseous medium to said inlet port and means for creating a suction effect at said outlet port.

2. In a motor vehicle comprising a body provided with a window and driven by an internal combustion engine, the improvement, which consists in double transparent window walls separated by a space, means for supplying a heated gaseous medium to said space, and a connection from said space to the intake of said engine.

3. In an automobile the combination with a hollow windshield of an air heater associated with and deriving heat from the automobile engine and having an air outlet connected to the interior of said windshield, and a connection from the windshield interior to the engine intake.

4. In an automobile driven by an internal combustion engine, a windshield comprising transparent walls separated by a space, means for supplying a heated gaseous medium to said space, and a connection from said space to the engine intake.

5. In an automobile driven by an internal combustion engine, a windshield comprising transparent walls separated by a space with an inlet to the end of said space at the driver's side of the car and an outlet from said space at the opposite end of the windshield, means for supplying a heated gaseous medium to said inlet port.

6. In an automobile driven by an internal combustion engine, a windshield comprising transparent walls separated by a space with an inlet port at one end of said space and an outlet port from said space at the opposite end thereof, an air heater associated with and deriving heat from the engine exhaust and having a heated air outlet connected to said inlet port, and a connection from said outlet port to the intake of the engine.

Signed at Shawnee-on-Delaware, in the county of Monroe and State of Pennsylvania, this 15th day of December, A. D. 1923.

EDWARD H. WORTHINGTON.